United States Patent [19]

Andrews

[11] Patent Number: 4,837,383

[45] Date of Patent: Jun. 6, 1989

[54] GLASS ENAMEL

[76] Inventor: Ray Andrews, 800 E. Beau St., Washington, Pa. 15301

[21] Appl. No.: 255,383

[22] Filed: Oct. 11, 1988

Related U.S. Application Data

[63] Continuation-in-part of Ser. No. 111,923, Oct. 23, 1987, and Ser. No. 212,252, Jun. 27, 1988.

[51] Int. Cl.$^4$ ............................ B05D 5/12; B05D 1/69
[52] U.S. Cl. ...................................... 427/108; 427/118; 427/269; 427/419.4; 427/376.3
[58] Field of Search ...................... 106/14.15; 427/108, 427/118, 269, 376.3, 419.4

[56] References Cited

U.S. PATENT DOCUMENTS

| | | | |
|---|---|---|---|
| 3,623,906 | 11/1971 | Akeyoshi et al. | 427/108 |
| 3,748,170 | 7/1973 | Michael | 427/376.3 |
| 4,420,501 | 12/1983 | Ueda | 427/376.2 |
| 4,635,026 | 1/1987 | Taeuchi | 338/22 |
| 4,684,388 | 8/1987 | Boaz | 65/24 |
| 4,684,389 | 8/1987 | Boaz | 65/24 |

*Primary Examiner*—Theodore Morris
*Attorney, Agent, or Firm*—Clifford A. Poff

[57] ABSTRACT

A glass enamel composition that may be fired upon a glass substrate to paint an opaques ceramic color. The glass enamel composition is of special utility in the formation of back windows of automobiles in which an electrically conductive heating grid is also to be formed. The glass enamel composition is comprised of lead or lead-free glass flux material, pigment, a printing vehicle, and an aluminum and/or lithium oxide. The aluminum and/or lithium oxide prevents sliding of the ceramic color to fibrous mold surfaces during hot forming the glass substrate. The aluminum and/or lithium oxide functions a migration preventor to prevent the migration of ions of the electrically conductive material to the glass which would, in the absence of the migration preventor, stain the glass.

38 Claims, No Drawings

GLASS ENAMEL

CROSS-REFERENCE TO RELATED APPLICATIONS

This application is a continuation-in-part of patent application Ser. No. 111,923, filed Oct. 23, 1987, now abandoned and Ser. No. 212,252, filed June 27, 1988.

BACKGROUND OF THE INVENTION

1. Field of the Invention

The present invention relates generally to glass enamel compositions which may be fired upon a glass substrate, and, more particularly, to a glass enamel composition containing aluminum and/or lithium oxide to prevent sticking of the enamel to molding surfaces for the glass substrate and as migration preventor to prevent the migration of a finely divided material such silver powder to the glass substrate.

2. Description of the Prior Art

In recent years, the automobile industry has manufactured automobiles with back windows which include electrical heating elements to remove frost formed on the window surface. The back windows, sometimes referred to in the industry as back lights, are printed by a silkscreen printing process with a grid of a metallic material which is then fired on the glass window to form the electrical heating element. In most instances, the grid arrangement forming the heating element is comprised of a bus bar extending along each side of the window, and a series of fine lines extending horizontally across the window, with the fine lines being connected to the bus bars. The grid material from which the heating element is formed typically of a mixture containing a silver powder and a small amount of soft-lead glass dispersed in a printing vehicle, such as oil, suitable for silkscreen printing. The grid material is applied to the glass substrate in a silk-screen printing process.

Also frequently applied to the back window is a dark grey or black border extending about the periphery, or outer edge, of the back window. The border is printed both for aesthetic reasons, and, also, to protect an adhesive utilized to seal the back window to the car body from degradation due to exposure to ultraviolet light.

In some instances, the bus bars of the heating element are printed on the back window next to the paint film edge of the border, but the visibility of the bus bars is aesthetically undesirable. In other instances, the bus bars are printed over the paint film of the color border, but, after firing, the bus bars are still visible, and appear from the outside of the automobile as a dark amber color. Not only is this design aesthetically undesirable, but printing of the bus bars over the color borders reduces the electrical conductivity of the bus bars, and also reduces the strength of the solder joints which must be applied to the bus bars to couple external electrical wires thereto.

Another problem associated with printing the bus bars upon the color border is staining of the glass. When the grid material containing silver is fired, an ion exchange occurs resulting in silver ions migrating through the ceramic paint and producing a dark amber stain in the glass.

One suggestion to prevent the detection of the bus bar from outside of the automobile is to alter the composition of the paint utilized to form the border. In particular, it has been proposed to add powdered zinc, tin, cadmium, or manganese to the ceramic color paint. The metal powder must be very fine, and have an average particle size of about one micron.

Because aluminum oxidizes at low temperatures, and oxidizes even more readily at higher temperatures, in the past, it had been thought that the use of aluminum as the metal powder to be added to the ceramic paint was not feasible, as the ceramic paint utilized to form the ceramic color border is usually fired at a temperature in excess of 1,100 degrees Fahrenheit.

Disclosed in U.S. Pat. Nos. 4,684,388 and 4,684,389 are means to form a glass sheet having an oil base ceramic paint fired thereupon wherein the ceramic paint contains a fine zinc metal powder. U.S. Pat. No. 4,684,388 further discloses the inclusion of a fine stannous oxide powder in an ultraviolet curable ceramic paint which, when applied to the glass sheet, is subjected to ultraviolet radiation and heated to a temperature to soften the glass sheet to allow bending thereof. The ceramic paint on the glass engages with a fiberglass covering on a forming die. The zinc and the stannous oxide powders serve to prevent the sticking of the ceramic paint to the fiberglass forming die. U.S. Pat. No. 4,684,389 discloses an oil base ceramic paint to which the fine zinc powder is added to the paint applied to the glass sheet. The painted glass sheet is then heated to a forming temperature and engaged with a fiberglass covering of a die to form a glass sheet of a desired shape. Again, the metal powder functions to prevent the sticking of the ceramic paint to the fiberglass of the forming die during the forming process.

It is therefore an object of the present invention to provide a method of applying glass enamel having a particular composition which is economical and avoids the problems with electrical conductivity, aesthetic appearances, and ion migration associated with prior art glass enamels utilized in silk-screen printing operations.

SUMMARY OF THE PRESENT INVENTION

In accordance with the present invention, a glass enamel composition and a process of applying, including firing the enamel onto a substrate, particularly, a glass substrate. The glass enamel composition includes a printing vehicle, a flux material, a glass color, and a migration preventor selected from the group consisting of aluminum or lithium oxide. It has been discovered that when aluminum powder or lithium carbonate is added to a glass color, which has a silver metal powder superimposed on it, the ion exchange is prevented which normally occurs when silver, or a silver salt is fired in contact with a vitrifiable ceramic substrate containing soda. A surprising discovery underlying the present invention is that this ion exchange does not occur when aluminum particles or lithium oxide is dispersed in the ceramic color. The use of aluminum or lithium oxide in the glass coating appears to be unique since other metal powders could only be used in a soda free flux. This provides the opportunity to use fluxes having better durability. Such sodium bearing fluxes include titanium and zirconium oxides. A number of tests have been made of printing silver over a ceramic color substrate which contains both sodium oxide and lithium oxide. The test pieces were fired at temperatures ranging between 1100 degrees Fahrenheit and 1350 degrees Fahrenheit. The silver powder preparation remains on the surface of the color without penetration.

The glass enamel composition is useful to carry out a method of decorating a glass substrate wherein according to one aspect of the present invention, the glass enamel composition is applied to a glass substrate and then an electrically resistive heating element is applied as a conductive coating including silver particles to the substrate. The glass enamel composition prevents migration of silver forming part of the electrically resistive heating elements and the enamel composition when fired.

In another aspect of the present invention the enamel composition is effective during hot forming of the glass substrate into a desired shape by molding with or without the presence of a conductive coating of silver particles. During the molding process a face surface of a mold member is provided with a layer of refractory cloth that is brought into contact with the enamel composition on the substrate without the enamel composition sticking or otherwise adhering to the refractory cloth because of the aluminum or lithium oxide component of the enamel composition.

The enamel composition of the present invention provides that the aluminum component thereof take a form of finely divided aluminum particles having an average particle size of greater than one micron. Aluminum flakes are effective when present in an amount of about 2½ percent by weight. Aluminum particles are effective when present in an amount of about 5 percent by weight. The aluminum may be present in an amount of between 5 and 10 percent or greater than 10 percent by weight. When amounts greater than 10 percent by weight are used, the fired enamel composition takes on a silver-grey appearance.

In the preferred embodiment, the printing vehicle forms reducing conditions when the glass enamel is fired to prevent rapid oxidation of aluminum forming migration preventor. The printing vehicle may be comprised of hydrogenated methyl ester of wood rosin, methyl ester of wood rosin, dehydro abietyl amine, hydrogenated wood rosin, dimerized wood rosin, abietic acid, linseed oil, bodied linseed oil, and thermoplastic resin.

In one embodiment of the present invention, the glass flux material is comprised of lead oxide, silica, boric oxide, aluminum oxide, titanium dioxide, and zirconium silicate. In another embodiment of the present invention, the glass flux material is comprised of lead oxide, silica, aluminum oxide, titanium dioxide, lithium oxide, boric acid and sodium oxide.

According to the present invention, lead-glass flux material can be used when the firing temperature for the enamel coating is typically between 1100 and 1350 degrees Fahrenheit. Lead-free glass flux can be used over the same temperature range and up to the working temperature of the substrate. An example of lead-free glass flux which will fire at 1120 degrees Fahrenheit and can be used is comprised of: (weight percent) 35% zinc oxide; 18% silica; 25% boric oxide; 6% calcium fluoride; 3% zircon; 3% titanium dioxide; and a 10% of an oxide selected from the group consisting of sodium oxide, potassium oxide, or lithium oxide. If a higher melting flux is desired, this can be accomplished by increasing the silica, the zircon or the titanium dioxide or adding aluminum oxide. The amount to be added will be controlled by the required increase in melting temperature which is desired.

The glass enamel composition of the present invention is especially useful in the decoration of a glass substrate, such as a back window of an automobile. In this use of the present invention, the glass enamel composition may be applied to the glass substrate (i.e., the back window), and the silver containing heating element is printed over the color on the glass substrate. The glass enamel composition prevents the migration of silver when present to the glass.

DESCRIPTION OF THE PREFERRED EMBODIMENTS

These features and advantages of the present invention as well as others will be more fully understood from the following detailed description of the present invention.

Preparation of the glass enamel composition of the present invention may conveniently occur by water grinding together lead-glass flux and pigment in a conventional ball mill. However, it is to be understood that other mixing apparatus may alternately be utilized.

In its broadest form, the glass enamel composition of the present invention is comprised of a printing vehicle, a flux material, pigment, and a aluminum or lithium oxide.

The flux material may be lead-free or comprised of many different combinations of lead glass flux components from the group consisting of soft lead glass, frit, glazes, or mixtures thereof. By mixing together the different flux components in varying amounts, varying firing temperatures may be achieved. For example, glass and frit operate at a firing temperature of 1,250 degrees Fahrenheit. Other flux components have different firing temperatures, and may be mixed with the frit to obtain other firing temperatures. The flux may be comprised of: 55% lead oxide, 30% silica, 4.5% boric oxide, 5% titanium dioxide, 4% zirconium silicate, 1% sodium oxide and 0.5% lithium oxide. A second flux mixture may be comprised of: 56% lead oxide, 33% silica, 4.5% titanium dioxide, 1.25% lithium oxide, and 4.25% boric acid.

A lead-free flux may be comprised of: 35% zinc oxide; 188% silica; 25% boric oxide; 6% calcium fluoride; 3% zircon; 3% titanium dioxide; and 10% of an oxide selected from the group consisting of sodium, potassium and lithium.

It is one discovery of the present invention that the addition of lithium oxide to the flux prevents ion migration, and the deleterious effects thereof, as is discussed hereinabove. The lithium oxide may conveniently be introduced to the mixture in the form of lithium carbonate. Aluminum may be chosen as a migration preventor and can be used with or without lithium oxide.

In this manner, and as will be explained in greater detail hereinbelow, forming of a glass substrate with ceramic color thereof for producing a window of an automobile may be carried out through various glass bending operations at different temperatures, as needed, to achieve a desired final complex shape.

The glass coloring material, i.e., the pigment, may be of any conventional pigments well known per se in the art. Once the desired flux material and the pigment have been ground theretogether in the ball mill, the resultant mixture, referred to as the color slurry, is dried and pulverized. This pulverized mixture is then loaded into a suitable mechanical mixer, such as a dough mixer.

Once loaded into the mechanical mixer, aluminum powder may be added to the pulverized mixture, and mixed therewith. Aluminum may be used soley as the migration preventor or combined with lithium oxide which was previously added to the mixture. Either aluminum or lithium oxide must be present. Printing oil is also added to this mixture. The resultant mixture takes the form of a paste.

A surprising discovery of the present invention is that the addition of aluminum to the ceramic paint composition prevents all of the problems which have been encountered in existing processes for decorating automobile glass that is hot formed to a desired shape. Aluminum also prevents the silver of the electrically conductive heating strips from migrating through the ceramic color border of the glass.

The paste is then passed through a three-roll paint mill in order to produce a smooth ceramic paint, free of flux or color agglomerates.

The printing vehicle, e.g. a squeegee oil, should contain one, or more, of the following plastisizers and rosins: hydrogenated methyl ester of wood rosin, methyl ester of wood rosin, dehydro abietyl amine, hydrogenated wood rosin, dimerized wood rosin, abietic acid, linseed oil, bodied linseed oil, and/or thermoplastic resin. The printing vehicle forms reducing conditions to prevent oxidation of the migration preventor when the glass enamel is fired.

In the preferred embodiment, the migration preventor comprises between one and twenty-five percent by weight of the resultant mixture. In the embodiment in which the migration preventor is aluminum powder with an average particle size of 4.5 to 6.5 microns, three to five percent by weight of aluminum powder may be used, or, amounts of aluminum powder in excess of ten percent may be utilized in order to fire a mat finish over a wide range of temperatures, while, at the same time, preventing a refractory cloth (sometimes referred to as fiberfrax) from sticking to the ceramic paint when in a molten condition during hot forming of a glass substrate upon which the ceramic paint is applied. Aluminum flakes are particularly useful and can comprise about 2½% by weight of the ceramic paint. The average particle size of the aluminum flakes is 17 microns. The ceramic paint must fire to a mat finish. A wide firing range is particularly useful in order to ensure that the glass enamel does not fire to a gloss finish. When the ceramic paint is fired in order to produce a mat finish, the glass enamel will not stick to the face of the mold used to form the glass substrate.

Because automobile back windows are sometimes bent into differing shapes, it often is necessary to heat the glass substrate to different temperatures for bending. This requires different firing temperatures of the ceramic paint. As previously mentioned, different fluxes, or mixtures thereof, may be utilized in order to obtain a flux having a desired firing temperature. The lead-glass fluxes are lead borosilicate compositions which are well known in the art. These lead glass fluxes range from those having very low melting compositions containing only lead oxide, boric oxide, and silica, to the higher melting, more chemically durable, ones which also contain sodium oxide, lithium oxide, aluminum oxide, titanium dioxide, and zirconium oxide.

In order to decorate a glass substrate utilizing the glass enamel composition of the present invention, the glass enamel composition is applied to the glass substrate as described hereinbefore, and the glass enamel composition is dried or cured. When desired a conductive, silver-containing coating is then applied to the substrate bearing the glass enamel composition and the silver-containing coating is fired.

The glass enamel composition in which aluminum powder and/or lithium oxide comprises the migration preventor is also of benefit in those situations in which the back window does not include the silver-containing heat-conducting elements. The presence of the fine aluminum powder and/or lithium oxide prevents sticking of the glass enamel to forming molds utilized to bend the glass. Thus in this instance, the aluminum and/or lithium oxide functions as an enamel release agent.

While the present invention has been described according to the preferred embodiments thereof, it is to be understood that other similar embodiments may be used or modifications and additions may be made to the described embodiments for performing the same functions of the present invention without deviating therefrom. Therefore, the present invention should not be limited to any single embodiment, but rather construed in breadth and scope in accordance with the recitation of the appended claims.

What I claim is:

1. A method of decorating a glass substrate said method including the steps of:
    applying to said glass substrate a glass enamel composition which includes a printing vehicle which forms reducing conditions when the glass enamel is fired to prevent rapid oxidation of aluminum, 5 to 25 percent by weight glass coloring agents, 1 to 25 percent by weight aluminum and the remainder being lead glass flux,
    drying or curing the glass enamel composition,
    applying a silver containing coating which includes finely divided electrically conductive silver and a glass binder,
    firing the substrate bearing the glass enamel composition and the silver containing coating onto the substrate whereby said aluminum prevents migration of silver in said silver containing coating in the fired glass enamel.

2. The method according to claim 1 wherein said firing is carried at a temperature of between 800 degrees Fahrenheit and 1300 degrees Fahrenheit to produce said reducing condition whereby rapid oxidation of said aluminum is prevented.

3. The method according to claim 2 including the further step of selecting glass enamel composition having a mixture of soft lead glass, frit and glazes.

4. The method according to claim 1 including the further step of selecting a glass enamel composition selected from the group consisting of soft lead glasses, frit and glazes.

5. The method according to claim 1 wherein said aluminum is finely divided aluminum having an average particle size to pass a 325 mesh screen.

6. The method according to claim 1 wherein said aluminum is present in an amount up to at least 10 percent by weight.

7. The method according to claim 1 wherein said aluminum is present in the form of aluminum flakes.

8. The method according to claim 1 wherein said aluminum is present in an amount greater than 10 percent by weight to give a silver gray to the glass enamel after firing.

9. The method according to claim 1 wherein said printing vehicle is selected from the group containing one or more of the following reducing agents:
    hydrogenated methyl ester of wood rosin; methyl ester of wood rosin; dehydo abietyl amine; hydrogenated wood rosin; dimerized wood rosin and abietic acid, linseed oil, bodied linseed oil and thermoplastic rosin.

10. A method of hot forming a glass substrate said method including the steps of:
applying to said glass substrate a glass enamel composition which includes a printing vehicle which forms reducing conditions when the glass enamel is fired to prevent rapid oxidation of aluminum, 5 to 25 percent by weight glass coloring agents, 1 to 25 percent by weight aluminum and the remainder being lead glass flux;
drying or curing the glass enamel composition;
heating the substrate bearing the glass enamel composition to a desired elevated temperature;
using the molten glass enamel to prevent sticking to a fibrous refractory facing of a mold facing when hot forming the substrate to a desired shape in the mold.

11. The method according to claim 10 wherein said heating is carried at a temperature of between 800 degrees F. and 1300 degrees F. to produce said reducing condition whereby rapid oxidation of said aluminum is prevented.

12. The method according to claim 10 including the further step of selecting a glass enamel composition from the group consisting of soft lead glasses, frit, and glazes.

13. The method according to claim 10 including the further step of selecting a glass enamel composition including a mixture of soft lead glass, frit and glaze.

14. The method according to claim 10 wherein said aluminum is finely divided aluminum having an average particle size to pass a 325 mesh screen.

15. The method according to claim 10 wherein said aluminum is present in an amount up to at least 10 percent by weight.

16. The method according to claim 10 wherein said aluminum is present in the form of aluminum flakes.

17. The method according to claim 10 wherein said aluminum is present in an amount greater than 10 percent by weight to give a silver gray to the glass enamel after firing.

18. The method according to claim 18 wherein said printing vehicle is selected from the group containing one or more of the following rosins or plasticizers which provide a reducing condition in the pre-heat zone of the kiln, before fusion of the lead glass flux occurs:
hydrogenated methyl ester of wood rosin; methyl ester of wood rosin; dehydo abietyl amine; hydrogenated wood rosin; dimerized wood rosin and abietic acid, linseed oil, bodied linseed oil and thermoplastic rosin.

19. A method of decorating a substrate, said method including the steps of:
applying to said substrate a glass enamel composition which includes a printing vehicle, a glass coloring agent, a flux material and a migration preventor selected from the group consisting of aluminum or lithium oxide;
drying or curing the glass enamel composition;
applying a coating includes finely divided particles capable of migration in glass enamel;
firing the substrate bearing said glass enamel composition and said coating onto the substrate whereby said migration preventor prevents migration of particle in said coating in the fired glass enamel.

20. The method according to claim 19 wherein said migration preventor is aluminum and wherein said printing vehicle forms reducing conditions when said glass enamel is fired to prevent rapid oxidation of the aluminum.

21. The method according to claim 19 including the further step of selecting glass enamel composition having a mixture of soft lead glass, frit and glazes.

22. The method according to claim 19 including the further step of selecting a glass enamel composition having lead free flux.

23. The method according to claim 22 wherein said lead-free flux is composed of zinc oxide, silica, boric oxide, calcium fluoride, zircon, titanium dioxide, and an oxide selected from the group consisting of sodium oxide, potassium oxide or lithium oxide.

24. The method according to claim 19 wherein said aluminum is aluminum flakes.

25. The method according to claim 24 wherein said aluminum flakes have an average particle size of 17 microns.

26. The method according to claim 19 wherein said aluminum is present in the form of aluminum powder.

27. The method according to claim 26 wherein said aluminum powder has a average particle size of 4.5 to 6.5 microns.

28. The method according to claim 19 wherein said printing vehicle is selected from the group containing one or more of the following reducing agents:
hydrogenated methyl ester of wood rosin; methyl ester of wood rosin; dehydo abietyl amine; hydrogenated wood rosin; dimerized wood rosin and abietic acid, linseed oil, bodied linseed oil and thermoplastic rosin.

29. The method according to claim 19 including the further step of:
using the glass enamel on the substrate to prevent sticking to a refractory lining of a fibrous mold facing when hot forming the substrate to a desired shape in a mold.

30. A method of hot forming a glass substrate said method including the steps of:
applying to said glass substrate a glass enamel composition which includes a printing vehicle,
a glass coloring agent, glass flux, and an enamel release agent selected from the group consisting of aluminum and lithium oxide.
drying or curing the glass enamel composition,
heating the substrate bearing the glass enamel composition to a desired elevated temperature,
using the molten glass enamel to prevent sticking to a fibrous refractory facing of a mold when hot forming the substrate to a desired shape in the mold.

31. The method according to claim 30 including the further step of selecting glass enamel composition having a mixture of soft lead glass, frit and glazes.

32. The method according to claim 30 including the further step of selecting a glass enamel composition having lead free flux.

33. The method according to claim 32 wherein said lead-free flux is composed of zinc oxide, silica, boric oxide, calcium fluoride, zircon, titanium dioxide, and an oxide selected from the group consisting of sodium oxide, potassium oxide or lithium oxide.

34. The method according to claim 30 wherein said aluminum is aluminum flakes.

35. The method according to claim 34 wherein said aluminum flakes have an average particle size of 17 microns.

36. The method according to claim 30 wherein said aluminum is present in the form of aluminum powder.

37. The method according to claim 36 wherein said aluminum powder has a average particle size of 4.5 to 6.5 microns.

38. The method according to claim 30 wherein said printing vehicle is selected from the group containing one or more of the following reducing agents:
hydrogenated methyl ester of wood rosin; methyl ester of wood rosin; dehydo abietyl amine; hydrogenated wood rosin; dimerized wood rosin and abietic acid, linseed oil, bodied linseed oil and thermoplastic rosin.

* * * * *